(12) United States Patent
Utsumi

(10) Patent No.: US 7,721,035 B2
(45) Date of Patent: May 18, 2010

(54) MULTIPROCESSOR SYSTEM, PROCESSOR AND INTERRUPT CONTROL METHOD

(75) Inventor: Keiko Utsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 11/843,503

(22) Filed: Aug. 22, 2007

(65) Prior Publication Data
US 2008/0065803 A1  Mar. 13, 2008

(30) Foreign Application Priority Data
Sep. 8, 2006  (JP) .............................. 2006-244832

(51) Int. Cl.
*G06F 13/24* (2006.01)
(52) U.S. Cl. ...................... 710/268; 710/260
(58) Field of Classification Search .......... 710/260–269
See application file for complete search history.

(56) References Cited

U.S. PATENT DOCUMENTS

| | | | | |
|---|---|---|---|---|
| 4,907,149 A | * | 3/1990 | Gula et al. .................. 710/264 |
| 4,972,312 A | * | 11/1990 | den Boef ..................... 710/269 |
| 5,214,793 A | * | 5/1993 | Conway et al. ............. 455/500 |
| 5,283,904 A | * | 2/1994 | Carson et al. ............... 710/266 |
| 5,371,884 A | * | 12/1994 | Ross ............................ 714/10 |
| 5,428,799 A | * | 6/1995 | Woods et al. ............... 710/266 |
| 5,857,090 A | * | 1/1999 | Davis et al. .................... 703/25 |
| 5,862,391 A | * | 1/1999 | Salas et al. .................. 713/300 |
| 6,189,065 B1 | * | 2/2001 | Arndt et al. ................. 710/260 |
| 6,711,643 B2 | * | 3/2004 | Park et al. ................... 710/260 |
| 7,328,294 B2 | * | 2/2008 | Kim et al. ................... 710/260 |
| 2005/0193260 A1 | | 9/2005 | Kato ........................... 714/34 |

FOREIGN PATENT DOCUMENTS

JP          5-324569      12/1993

* cited by examiner

*Primary Examiner*—Paul R Myers
(74) *Attorney, Agent, or Firm*—Fitzpatrick, Cella, Harper & Scinto

(57) ABSTRACT

A first processor in a multiprocessor system for processing interrupts by a plurality of processors accepts an interrupt and executes first interrupt processing in accordance with the accepted interrupt. In the first interrupt processing, second interrupt processing corresponding to the accepted interrupt is assigned to a second processor.

22 Claims, 17 Drawing Sheets

FIG. 3

| 301 INTERRUPT CAUSE | 302 PRIORITY | 303 INTERRUPT HANDLER | |
|---|---|---|---|
| INTERRUPT A | 0 | HANDLER A | HIGH ⎫ 310 |
| INTERRUPT B | 1 | HANDLER B | ⎬ |
| INTERRUPT C | 2 | HANDLER C | |
| INTERRUPT D | 3 | HANDLER D | |
| ⋮ | ⋮ | ⋮ | |
| INTERRUPT X | 9 | HANDLER X | ⎫ 311 |
| INTERRUPT Y | 9 | HANDLER Y | LOW ⎭ |

FIG. 4

| 301<br>INTERRUPT CAUSE | 401<br>PARALLEL PROCESSING | 402<br>PROCESSING STATE |
|---|---|---|
| INTERRUPT A | OK | — |
| INTERRUPT B | NG | PROCESSABLE |
| INTERRUPT C | OK | — |
| INTERRUPT D | NG | PROCESSING IN PROGRESS |
| ⋮ | ⋮ | ⋮ |
| INTERRUPT X | OK | — |
| INTERRUPT Y | NG | STANDING BY |

FIG. 7

| CPU-ID 701 | OPERATING STATE 702 |
|---|---|
| SLAVE CPU 1 | IN USE |
| SLAVE CPU 2 | IN USE |
| SLAVE CPU 3 | IN USE |
| SLAVE CPU 4 | IDLE ~ 703 |
| SLAVE CPU 5 | IN USE |
| SLAVE CPU 6 | IN USE |

F I G. 10
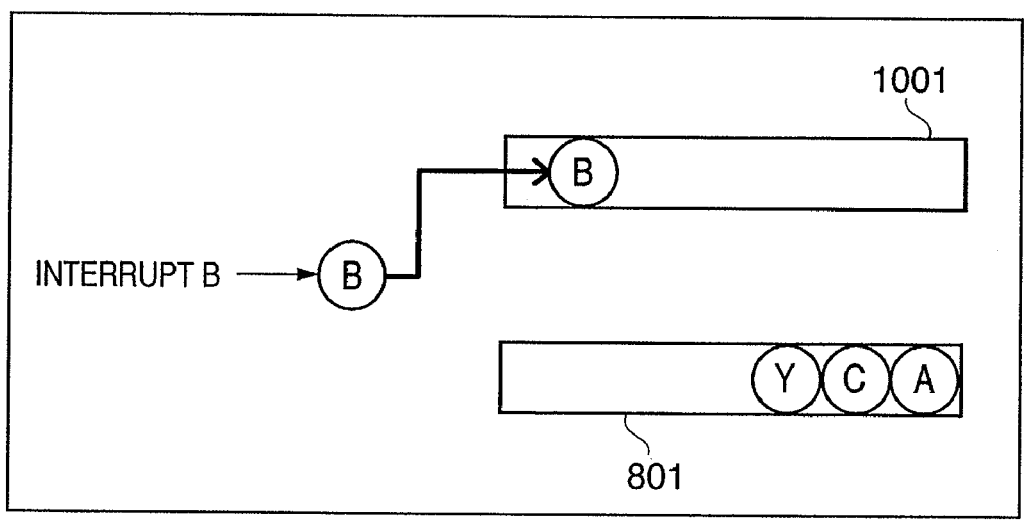

MULTIPROCESSOR SYSTEM, PROCESSOR AND INTERRUPT CONTROL METHOD

BACKGROUND OF THE INVENTION

1. Field of the Invention

The present invention relates to a multiprocessor system, processor and interrupt control method.

2. Description of the Related Art

In an interrupt system of a controller or the like, an excellent real-time capability is required for system control. The reason for this is that if an interrupt corresponding to system control occurs and the time it takes for interrupt processing to end exceeds a preset time, a malfunction will occur in system control.

The real-time capability of a system is decided by the delay time of interrupt processing. Many causes of such delay are excessive interrupt-processing steps and interruption sources. Further, since a separate interrupt cannot be accepted during interrupt processing, the time from occurrence of the interrupt to the start of processing is prolonged.

Control of interrupt processing in a multiprocessor system is very complicated. In order to deal with multiple interrupts, therefore, often a dedicated CPU is decided in advance and interrupt processing is executed solely by the decided CPU. That is, often interrupt processing is assigned to a dedicated CPU even though all CPUs are capable of accepting interrupts as far as the hardware is concerned.

For these reasons, various proposals have been made with the aim of raising the speed of interrupt processing and affording versatility. Specific examples of such proposals will be described below.

A method of enhancing real-time capability in a multiprocessor system has been proposed (e.g. Japanese Patent Application Laid-Open No. 05-324569). According to this proposal, when a certain CPU attains the idle state, this CPU disables interrupt handling by other CPUs and handles all interrupts. Further, register values are set in such a manner that one or a plurality of CPUs executes interrupt processing per type of interrupt, and the CPU that will execute interrupt processing is selected.

With the method of Japanese Patent Application Laid-Open No. 05-324569, however, only an idle CPU is capable of acquiring an interrupt. If there is no CPU that is idle, therefore, then no CPU can acquire an interrupt. Further, register values are set in such a manner that one or a plurality of CPUs executes interrupt processing per interrupt type of all types. If the hardware configuration is changed or if the causes of interrupts increase or decrease, therefore, the register value settings and the number thereof required must also be changed. The result is lack of versatility.

Further, a method of enhancing real-time capability without being affected by an interrupt controller also has been proposed (e.g., U.S. Patent Application Laid-Open No. 2005/0193260). According to this proposal, interrupt tasks for processing respective interrupts are generated and interruption levels that have been decided with regard to interrupts processed by the interrupt tasks are reflected in the priorities of the interrupt tasks. When an interrupt is accepted, the interrupt task that handles the accepted interrupt is activated and control is transferred to a scheduler.

However, the proposal of U.S. Patent Application Laid-Open No. 2005/0193260 is such that if many interrupts having a high degree of priority occur, a large number of high-priority tasks are activated and real-time operation cannot be assured. Further, there is the possibility that low-priority interrupt processing will not be executed for long periods of time.

SUMMARY OF THE INVENTION

Accordingly, the present invention realizes to so arrange it that one processor accepts an interrupt and assigns interrupt processing to another processor.

Further features of the present invention will become apparent from the following description of exemplary embodiments with reference to the attached drawings.

BRIEF DESCRIPTION OF THE DRAWINGS

FIG. 3 is a diagram illustrating an example of the content of a table for setting the correspondence between interrupt causes and interrupt handlers;

FIG. 4 is a diagram illustrating an example of a table for setting whether an interrupt cause 301 shown in FIG. 3 is capable of undergoing parallel processing;

FIG. 7 is a table diagram illustrating an example of the operating states of slave CPUs;

FIG. 10 is a diagram illustrating an example of a queue stored as processing-end queue items in a case where an interrupt for which parallel processing cannot be executed occurs and processing of this interrupt is being executed;

DESCRIPTION OF THE EMBODIMENTS

First Embodiment

Preferred embodiments of the present invention will be described with reference to the drawings.

Figure 1:
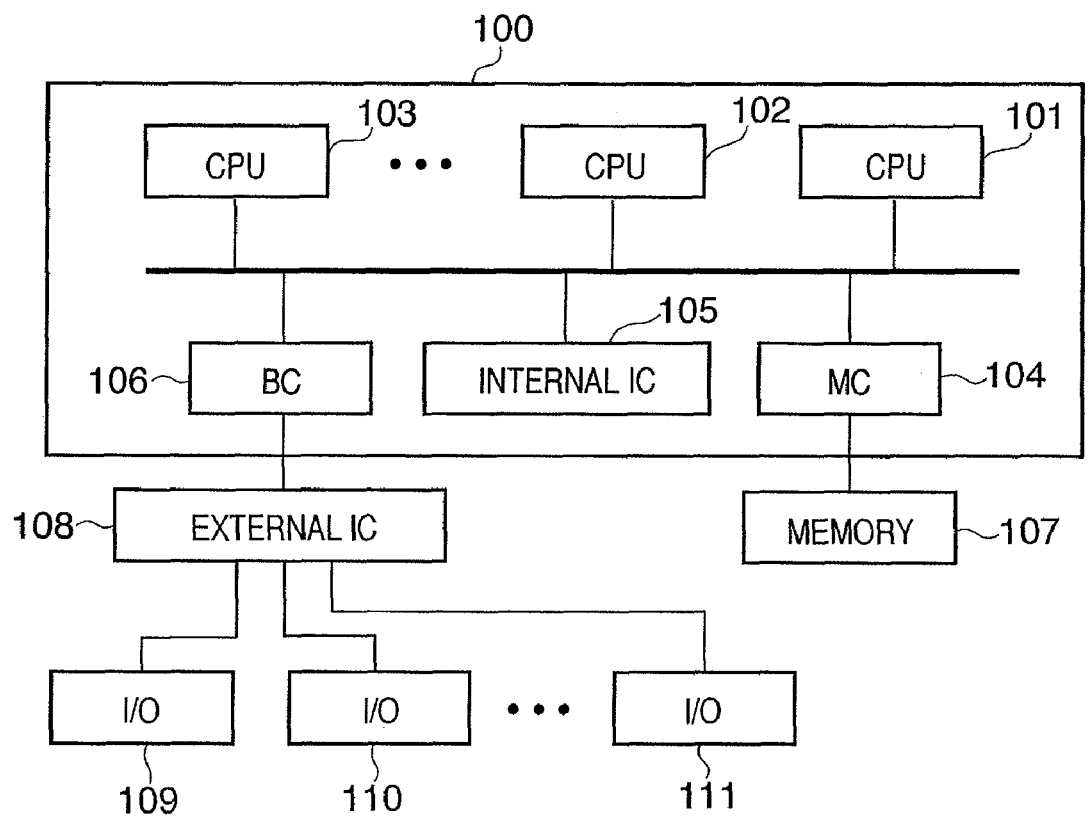
FIG. 1 is a block diagram illustrating an example of the configuration of a bus-sharing multiprocessor system in which multiprocessor-system interrupt control is adopted.

FIG. 1 is a block diagram illustrating an example of the configuration of a shared-bus multiprocessor system 100 in which multiprocessor-system interrupt control is adopted. As shown in FIG. 1, the multiprocessor system 100 includes processors (CPUs) 101 to 103 for executing data processing, computational processing and control; and a memory controller (MC) 104 for controlling a shared memory 107 of the CPUs 101 to 103. Data necessary for operation of the CPUs 101 to 103 is stored in the shared memory 107.

The multiprocessor system 100 further includes an internal interrupt controller (IC) 105 for controlling the interruption of CPUs 101 to 103 within the multiprocessor system 100. An external interrupt controller 108 (described later) controls interrupts from external devices 109 to 111 connected to the multiprocessor system 100. If interrupts from the external devices 109 to 111 are sensed, the internal interrupt controller 105 is so notified via a bus controller 106.

Figure 2:
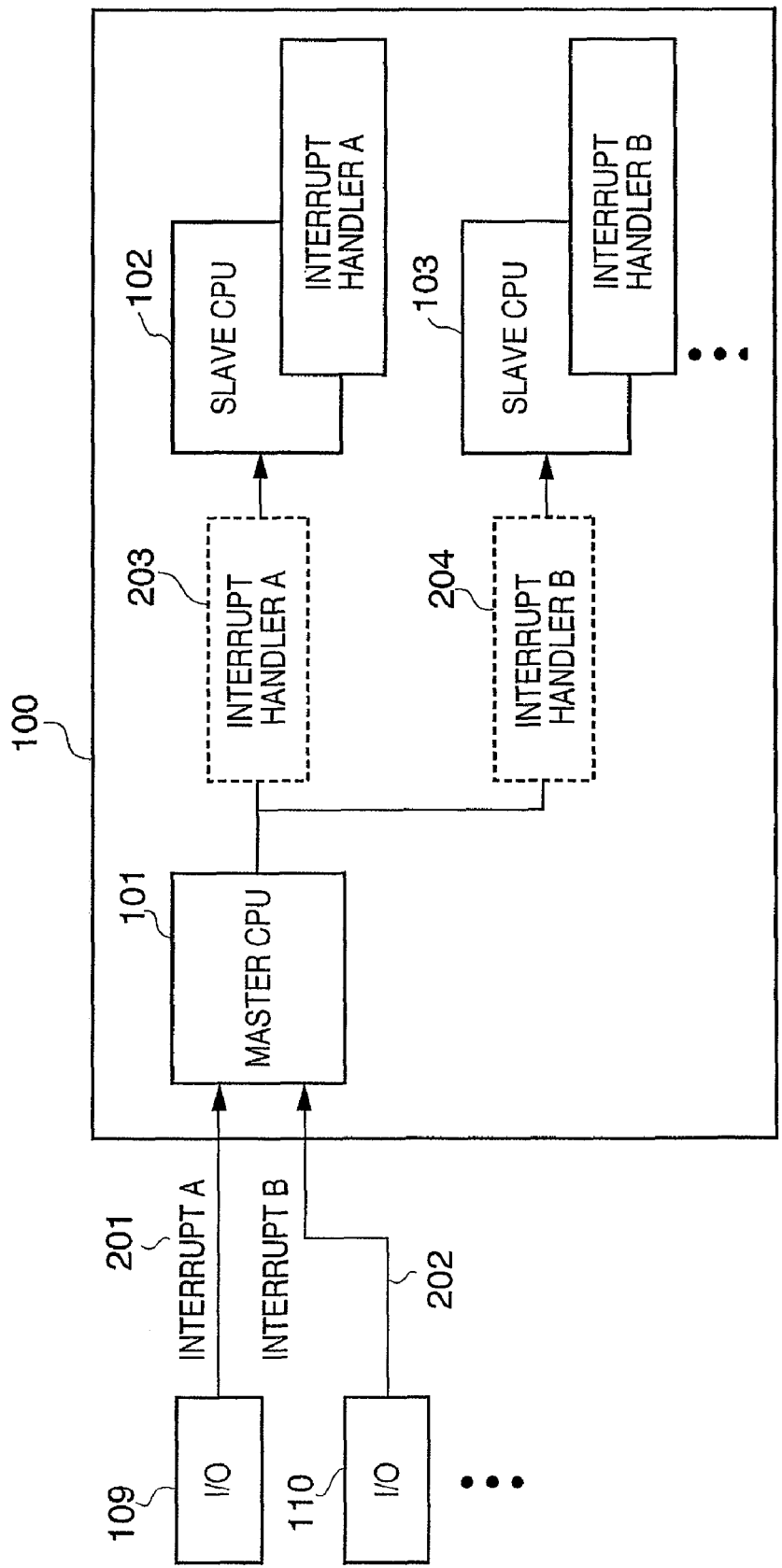
FIG. 2 is a conceptual view illustrating an overview of interrupt processing in this embodiment.

FIG. 2 is a conceptual view illustrating an overview of interrupt processing according to this embodiment. First, the CPU that accepts an interrupt from the external interrupt controller 108 is decided beforehand among the CPUs 101 to 103, and this CPU is adopted as the master CPU (CPU 101 in this example). Accordingly, the internal interrupt controller 105 notifies the master CPU 101 of all external interrupts received from the external interrupt controller 108. CPUs other than the master CPU 101 are adopted as slave CPUs (CPUs 102 and 103 in this example), and the CPUs 102, 103 are made the CPUs that execute interrupt processing.

If an interrupt A 201 is generated by the external device 109 and an interrupt B 202 is generated by the external device 110, then the master CPU 101, which is the interrupt receiving CPU, is notified of the interrupts A 201, B 202. The master CPU 101 retrieves interrupt handlers A 203 and B 204 that correspond to the interrupt A 201 and interrupt B 202, respectively, of which the master CPU 101 has been notified. The retrieved interrupt handlers A 203 and B 204 are transmitted respectively to the CPUs 102 and 103, which are in the idle state, and the handlers are processed by the respective CPUs.

In this embodiment, there is no restriction upon the number of CPUs that construct the multiprocessor system 100, and the number of CPUs can be increased or decreased depending upon the system configuration and number of processing steps. For example, in a case where the number of slave CPUs is increased, the number of processes executed by the interrupt handlers corresponding to the interrupts also can be increased and interrupt waiting time can be reduced overall.

FIG. 3 is a diagram illustrating an example of the content of a table for setting the correspondence between interrupt causes and interrupt handlers. As illustrated in FIG. 3, this table is composed of interrupt cause 301, priority 302 and interrupt handler 303 and is stored in the memory 107.

All interrupt causes generated by the connected external devices 109 to 111 have been registered under the interrupt cause 301. Since the interrupt cause 301 differs depending upon the type of external device, there are a wide variety of interrupt causes depending upon the system configuration. For example, in the case of a personal computer, interrupts from a keyboard, mouse, network (LAN) and CD-ROM drive, etc., are registered as interrupt causes.

Priorities of interrupt processing classified by interrupt cause 301 are set under priority 302. In this embodiment, priority 302 ranges from 0 to 9 and decreases in ascending order. In other words, interrupts are processed with priority 0 as the highest priority and priority 9 as the lowest.

An interrupt handler activated as an interrupt process is set under interrupt handler 303 after interrupt cause 301 is received. Although an interrupt-handler function address or the like generally is set, the handler is described by a handler name in this embodiment in order to simplify the description of the invention. Further, since the interrupt cause 301 and priority 302 each differ depending upon the system configuration, purpose and constraints, the names of interrupt causes are not specifically set forth in this embodiment.

The first embodiment, which is a specific method of implementation, will be described below with reference to the drawings.

Processing when an interrupt is received by the master CPU 101 will be described with reference to FIGS. 4 and 5. FIG. 4 is a diagram illustrating an example of a table for setting whether the interrupt cause 301 shown in FIG. 3 is capable of undergoing parallel processing. As shown in FIG. 4, information as to whether the interrupt cause 301 is capable of undergoing parallel processing is set under parallel processing 401. In the first embodiment, "NG" is set if the interrupt cause is not parallel processable and "OK" is set if the interrupt cause is parallel processable. Further, the processing state of an interrupt handler corresponding to an interrupt that is not parallel processable is set under processing state 402. This table is stored in the memory 107. The processing state 402 and method of changing over the processing state will be described later.

Figure 5:
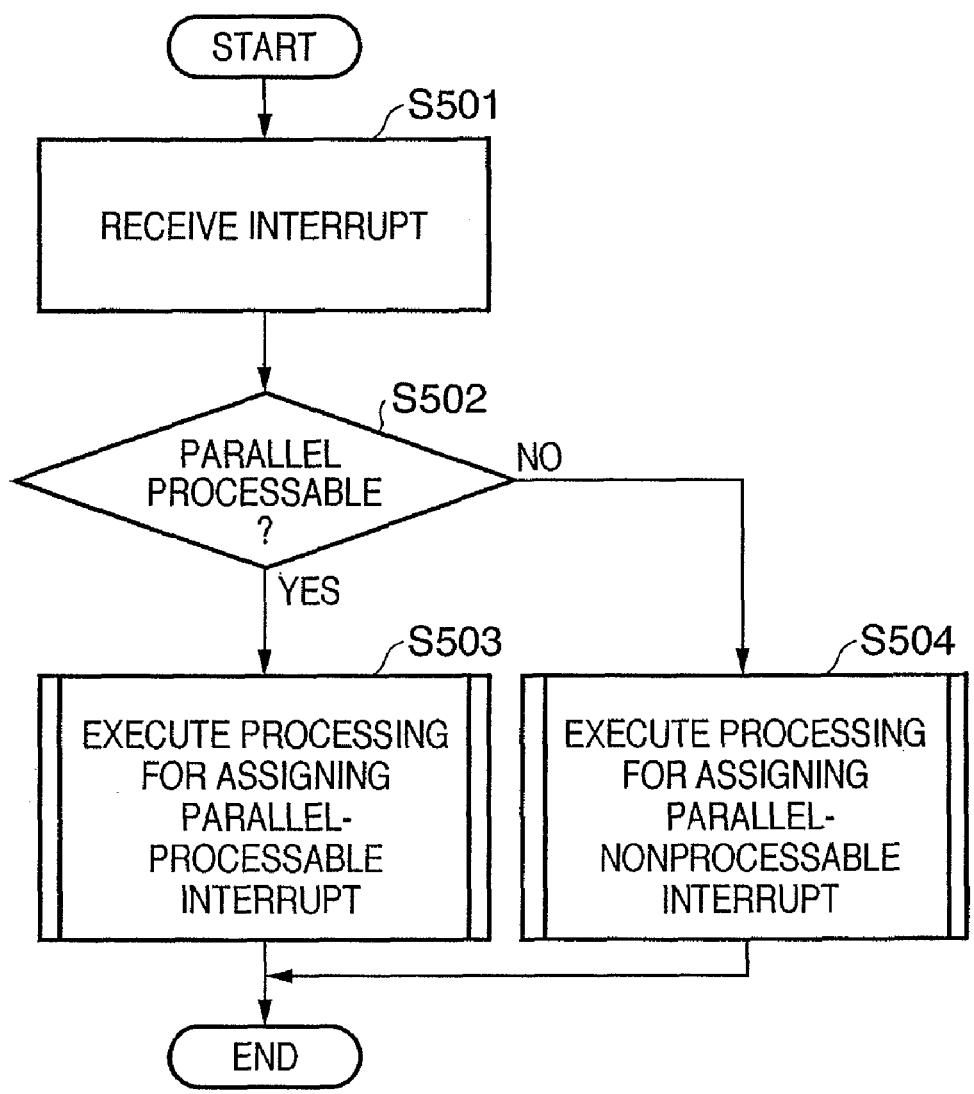
FIG. 5 is a flowchart illustrating the flow of interrupt processing by a master CPU 101 in a first embodiment.

FIG. 5 is a flowchart illustrating the flow of interrupt processing by the master CPU 101 in the first embodiment. First, at step S501, the master CPU 101 receives an interrupt from the external interrupt controller 108 of which the internal interrupt controller 105 is notified via the bus controller 106. Next, whether the interrupt processing to be executed with regard to the received interrupt is parallel processable is determined at step S502 using the table shown in FIG. 4. If the interrupt cause 301 of the received interrupt is interrupt A, then it is decided from parallel processing item 401 that parallel processing is possible by the interrupt handler. If the interrupt cause 301 of the received interrupt is interrupt B, then it is decided from parallel processing item 401 that parallel processing is not possible by the interrupt handler.

If it is decided at step S502 that parallel processing is possible, then control proceeds to step S503. Here processing for assigning an interrupt handler that is capable of parallel processing is executed. The processing for assigning an interrupt handler that is capable of parallel processing will be described later with reference to FIGS. 6 to 9.

If it is decided at step S502 that parallel processing is not possible, on the other hand, control proceeds to step S504. Here processing for assigning an interrupt handler that is not capable of parallel processing is executed. The processing for assigning an interrupt handler that is not capable of parallel processing will be described later with reference to FIGS. 10 and 11.

Figure 6:
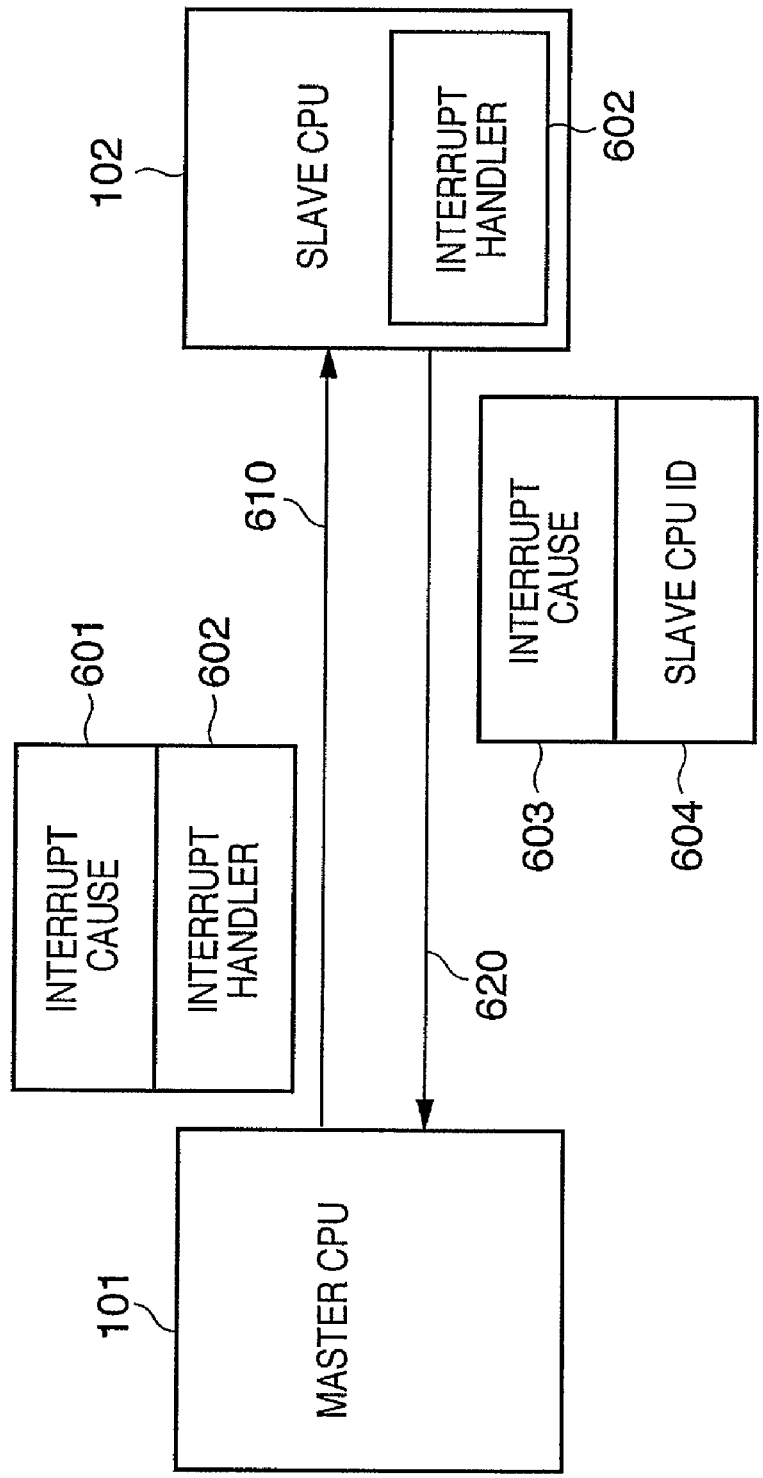
FIG. 6 is a diagram illustrating an example of state of communication between a master CPU 101 and slave CPU 102.

Next, reference will be had to FIGS. 6 to 9 to describe processing of step S503 in FIG. 5 for assigning an interrupt handler that is capable of parallel processing. FIG. 6 is a diagram illustrating an example of state of communication between the master CPU 101 and the slave CPU 102.

FIG. 7 is a table diagram illustrating an example of the operating states of slave CPUs. CPU-ID 701 in FIG. 7 is an identifier for identifying slave CPUs. The operating states of the slave CPUs are indicated at 702. In this example, the operating state 702 of the slave CPU whose CPU-ID 701 is "SLAVE CPU 4" is "IDLE" 703. The other slave CPUs are all indicated as being "IN USE". This table is stored in the memory 107.

Figure 8:
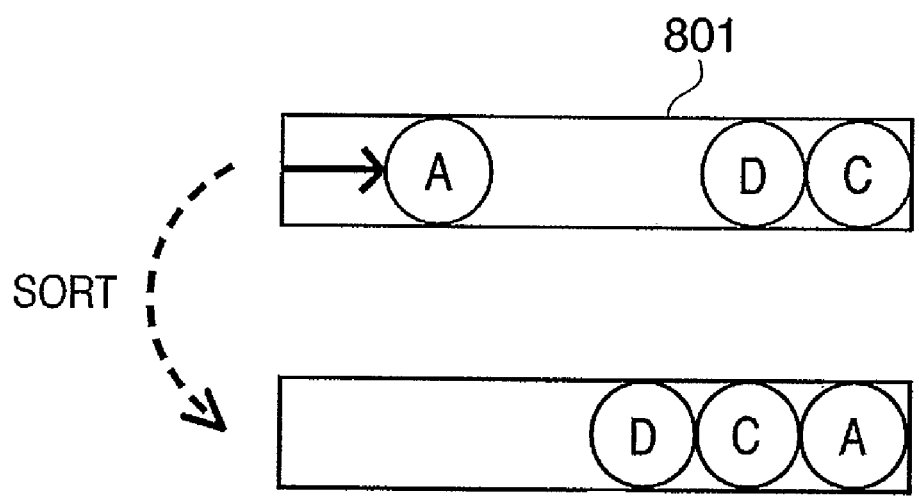
FIG. 8 is a diagram illustrating an example of a queue stored as processing queue items when all slave CPUs are in operation and are incapable of executing interrupt processing.

FIG. 8 is a diagram illustrating an example of a queue stored as processing queue items when all slave CPUs are in operation and are incapable of executing interrupt processing. In the example shown in FIG. 8, this is a case where interrupt A has been generated anew in a state in which interrupts C and D have been stored in an interrupt processing queue 801. In this case, interrupt A has a priority 302 of 0, which is the highest priority, as indicated in FIG. 3, and therefore the master CPU 101 sorts the interrupt A to be at the leading end of the interrupt processing queue 801. It should be noted that the interrupt processing queue 801 is stored in the memory 107.

Figure 9:
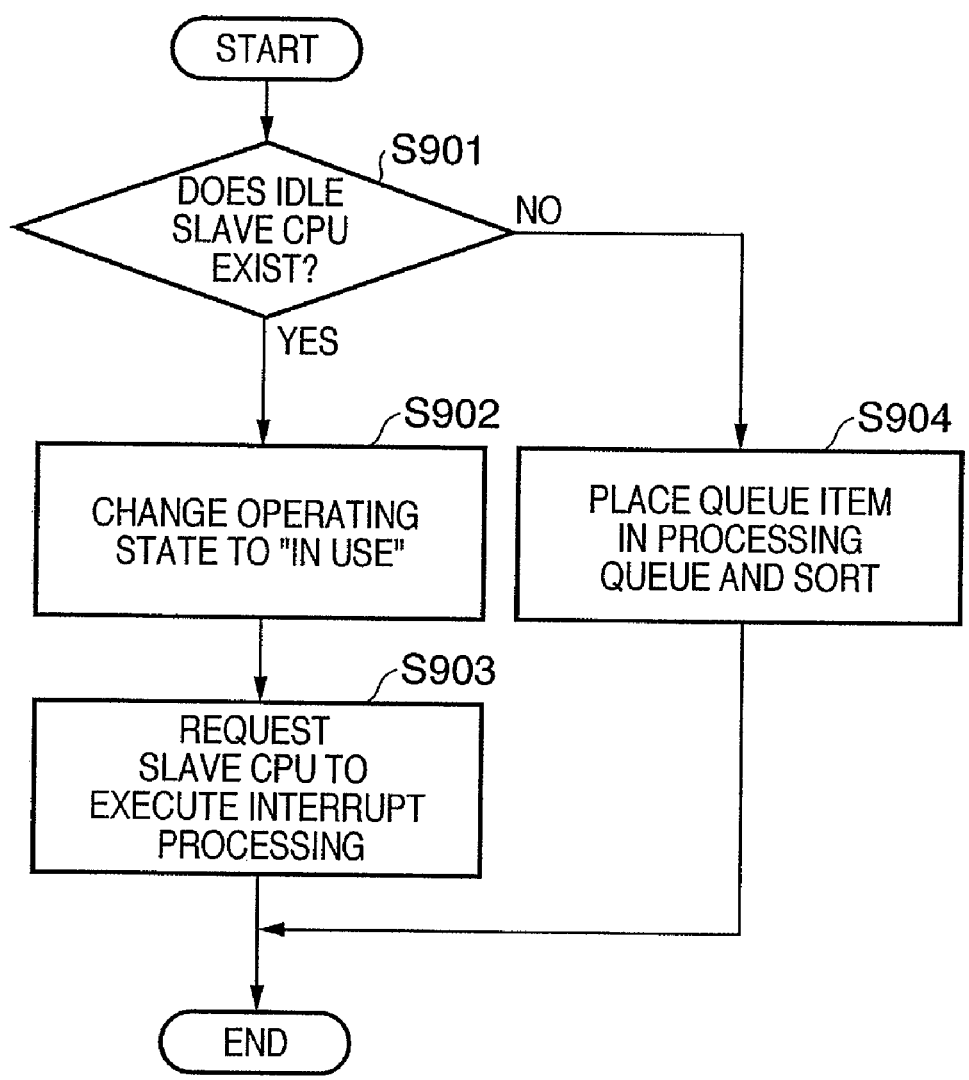
FIG. 9 is a flowchart illustrating processing for assigning an interrupt handler that is capable of parallel processing.

FIG. 9 is a flowchart illustrating processing for assigning an interrupt handler that is capable of parallel processing. Described in this example will be interrupt-handler assignment processing executed by the master CPU 101 when the interrupt A is accepted from the external device 109 as the interrupt cause 301.

First, at step S901, whether an idle slave CPU exists is determined using the table shown in FIG. 7. Specifically, the table indicating the operating states of the slave CPUs is searched. If an idle slave CPU exists, control proceeds to step S902 and the operating state 702 (slave CPU 4 in the example of FIG. 7) is changed to "IN USE". This processing is exclusion control executed in order that interrupt-handler processing requests will not be duplicated.

Next, at step S903, an interrupt-handler processing request is transmitted to this slave CPU. Specifically, the table shown in FIG. 3 indicating the correspondence between interrupt causes and interrupt handlers is searched and the interrupt handler A corresponding to interrupt A is decided upon. A processing request 610 of interrupt handler A is transmitted to the slave CPU that was recognized as being idle at step S901. As illustrated in FIG. 6, the processing request 610 transmitted by the master CPU 101 is a packet that includes an ID 601, which identifies the interrupt cause, and an interrupt handler 602.

If it is found at step S901 that an idle slave CPU does not exist, then control proceeds to step S904. Here the interrupt A is stored in the interrupt processing queue 801, as illustrated in FIG. 8, and the system waits for a slave CPU to become idle. It should be noted that the master CPU 101 sorts the interrupt A in the order of priority in accordance with the priority 302 shown in FIG. 3. In this case, the interrupt A is sorted to be at the leading end of the interrupt processing queue 801, as illustrated in FIG. 8.

Figure 11:
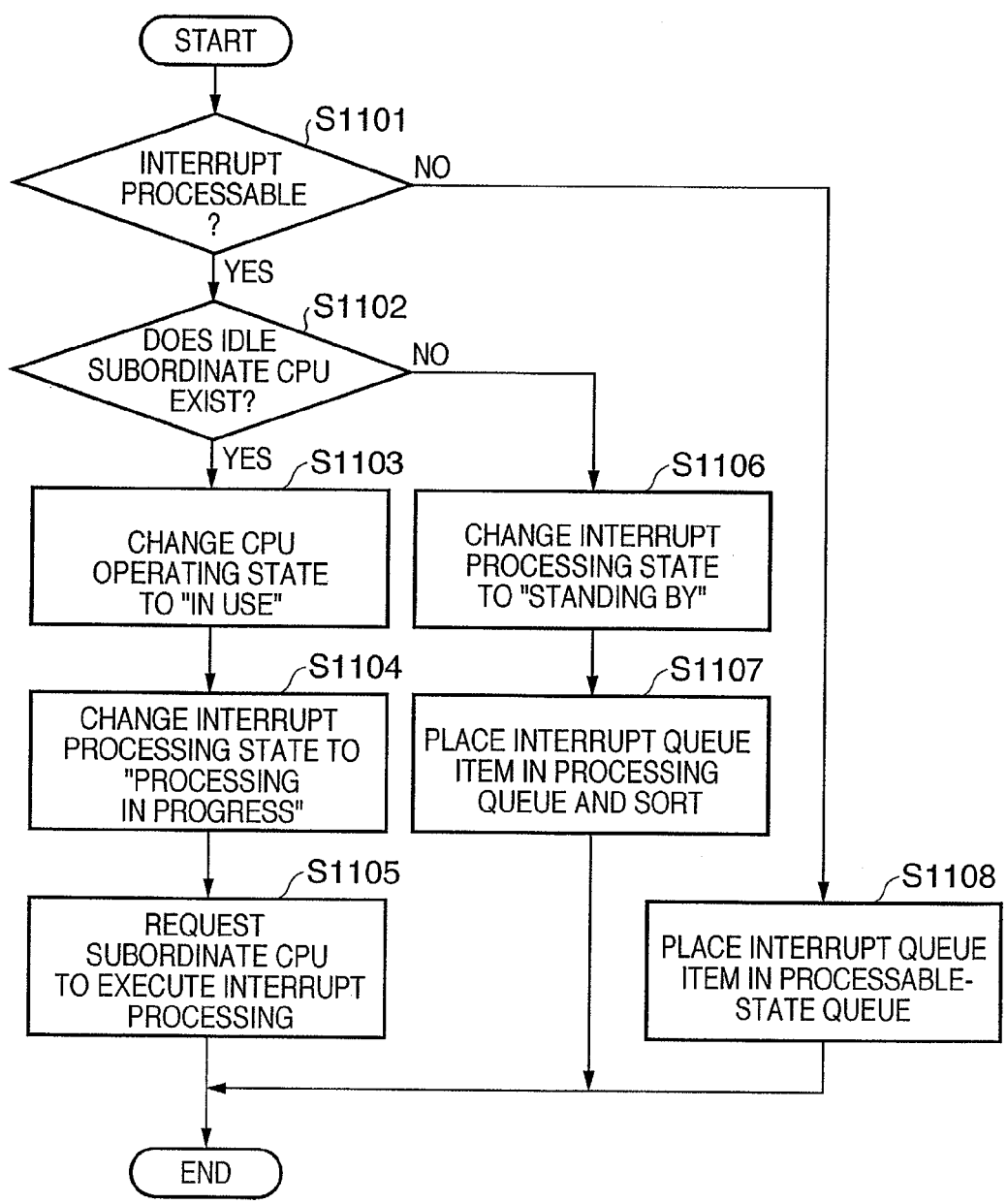
FIG. 11 is a flowchart illustrating processing for assigning an interrupt handler that is incapable of parallel processing.

Reference will be had to FIGS. 10 and 11 to describe the processing of step S504 in FIG. 5 for assigning an interrupt handler for which parallel processing is not possible. FIG. 10 is a diagram illustrating an example of a queue 1001 stored as processing-end queue items in a case where an interrupt for which parallel processing cannot be executed occurs and processing of this interrupt is being executed. This processable-state queue 1001 is stored in the memory 107.

FIG. 11 is a flowchart illustrating processing for assigning an interrupt handler that is incapable of parallel processing. Described in this example will be interrupt-handler assignment processing executed by the master CPU 101 when the interrupt B is accepted from the external device 110 as the interrupt cause 301.

First, at step S1101, whether an interrupt handler corresponding to the interrupt is capable of executing processing is determined using the table shown in FIG. 4. As illustrated in FIG. 4, there are three processing states 402, namely "PROCESSING IN PROGRESS", which means that processing is being executed by the slave CPU; "STANDING BY", which means that the interrupt has been queued in the interrupt processing queue 801; and "PROCESSABLE", which means that processing is possible.

If the processing state 402 of the interrupt handler is indicative of "PROCESSABLE", control proceeds to step S1101, where it is determined whether an idle slave CPU exists. This processing is similar to the processing for assigning an interrupt handler that is capable of parallel processing. If the result of the determination is that an idle slave CPU exists, control proceeds to step S1103, where the operating state 702 of this slave CPU is changed to "IN USE". Then, at step S1104, the processing state 402 of interrupt handler B is changed to "PROCESSING IN PROGRESS". This is exclusion control executed in order that interrupt-handler processing will not operate in parallel. Next, at step S1105, the slave CPU is requested to execute the processing of the interrupt handler.

If it is found at step S1102 that an idle slave CPU does not exist, then control proceeds to step S1106 and the processing state 402 is changed to "STANDING BY". In other words, the processing state 402 of the interrupt received at step S1101 is changed to "STANDING BY". This processing is exclusion processing that prevents a plurality of interrupts B from being placed in the interrupt processing queue 801 and is executed in order that the interrupt handler B will not mistakenly operate in parallel. Then, at step S1107, in a manner similar to the processing at step S904 described above, the interrupt B is stored in the interrupt processing queue 801 and the system waits for a slave CPU to become idle. It should be noted that the master CPU 101 sorts the interrupt B in the order of priority in accordance with the priority 302 shown in FIG. 3.

If it is determined at step S1101 that the processing state 402 of interrupt B is "STANDING BY" or "PROCESSING IN PROGRESS", on the other hand, then control proceeds to step S1108 and the system waits for the processing state 402 to become "PROCESSABLE". In this case, as illustrated in FIG. 11, the interrupt B is not stored in the interrupt processing queue 801 but is saved in the processable-state queue 1001 until the processable state is attained.

Next, reference will be had to FIG. 6 to describe processing on the slave CPU side when the slave CPUs 102, 103 have received a processing instruction transmitted from the master CPU 101. This processing is common to slave CPUs regardless of whether the interrupt processing is capable of being executed in parallel.

First, the slave CPU 102 receives the interrupt-handler processing request 610 from the master CPU 101 and executes the processing of the received interrupt handler 602. When interrupt-handler processing ends, the slave CPU 102 transmits processing-end notification 620 to the master CPU 101. The processing-end notification 620 is a packet that includes an ID 603, which identifies the interrupt cause, and a slave CPU-ID 604, which is the identifier of the slave CPU 102.

Figure 12:
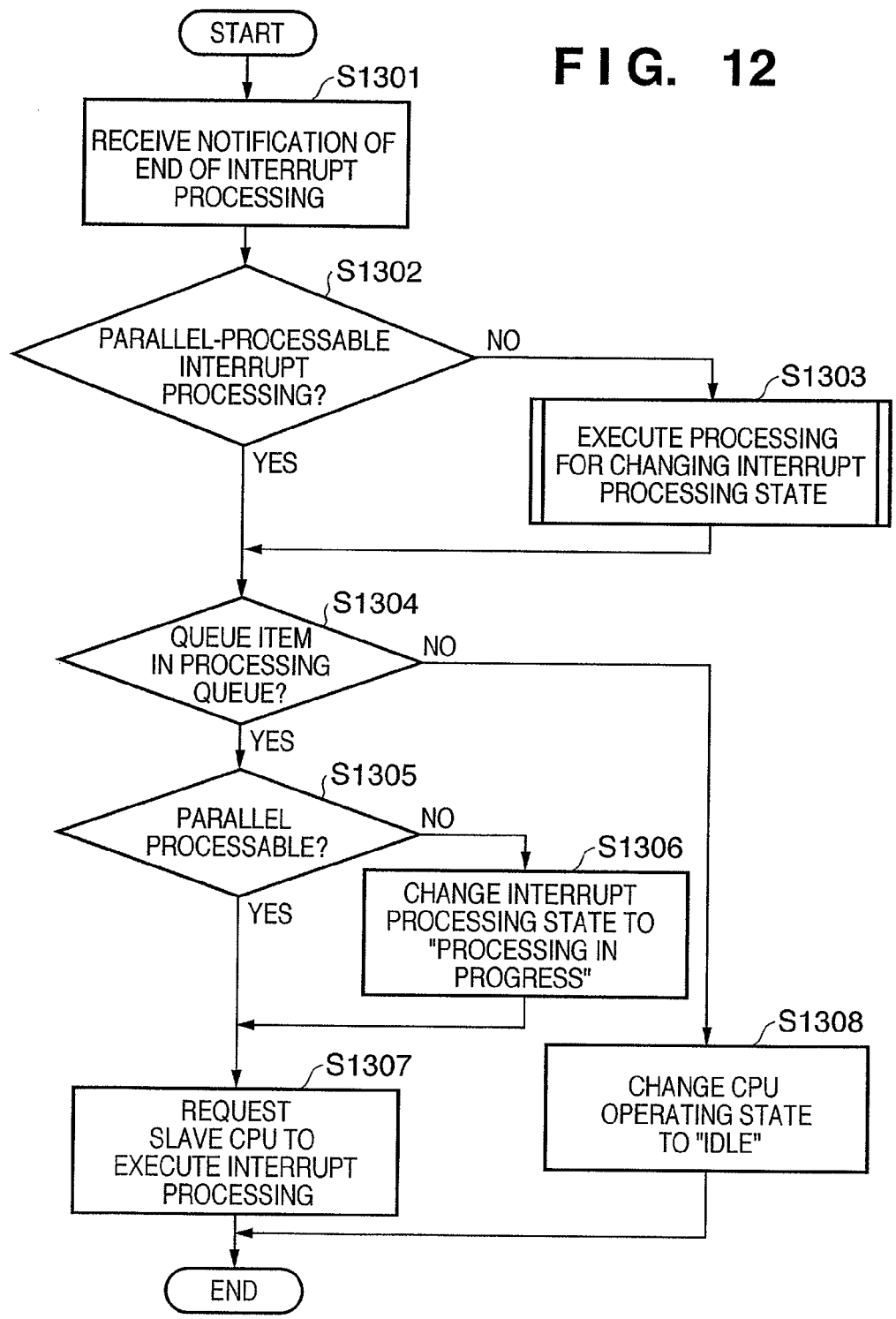
FIG. 12 is a flowchart illustrating processing that follows end of interrupt-handler processing of a master CPU in the first embodiment.

Next, reference will be had to FIG. 12 to describe processing on the side of the master CPU that has received the processing-end notification transmitted from the slave CPU.

FIG. 12 is a flowchart illustrating processing that follows end of interrupt-handler processing of the master CPU according to the first embodiment. First, at step S1301, the master CPU 101 receives the interrupt-handler processing-end notification 620 from the slave CPU. The processing-end notification 620 includes the slave CPU-ID 604, which is the identifier of the slave CPU, and the type 603 of interrupt cause for which processing has ended.

Next, at step S1302, using the table shown in FIG. 4, the master CPU 101 determines whether the interrupt handler of interrupt cause 512 for which processing has ended is capable of parallel processing based upon the processing-end notification 620 received at step S1301. If notification of end of interrupt B or D has been received, it is determined that parallel processing is not possible and control proceeds to step S1303, where processing for changing the processing state is executed. The processing for changing the processing state will be described later.

If processing-end notification of a parallel-processable interrupt is received at step S1302, control proceeds to step S1304. Here it is determined whether the interrupt processing queue 801 contains a processing-wait interrupt queue item. If this queue item is not present, control proceeds to step S1308. Here the operating state of the slave CPU shown in FIG. 7 is changed from "IN USE" to "IDLE" based upon the slave CPU-ID 604 received at step S1301. By virtue of this processing, this slave CPU attains a state in which it is capable of accepting an interrupt-handler processing request.

If an interrupt queue item is determined to exist at step S1304, control proceeds to step S1305. The master CPU 101 acquires the interrupt at the leading end of the interrupt processing queue 801 and refers to FIG. 4 to determine whether the interrupt handler of this interrupt is capable of parallel processing. If it is determined that this interrupt handler is incapable of parallel processing, control proceeds to step S1306. Here the processing state 402 of the interrupt corresponding to the leading interrupt acquired at step S1304 is changed from "STANDING BY" to "PROCESSING IN PROGRESS". This is exclusion control performed in order that the interrupt-handler processing will not operate in parallel. For example, in a case where the leading interrupt queue item is interrupt B, the processing state of data 405 is changed to "PROCESSING IN PROGRESS".

Further, if it is determined at step S1305 that the interrupt is one for which parallel processing is possible, then control proceeds to step S1307. Here processing of the interrupt handler corresponding to the leading interrupt acquired at step S1305 is requested based upon the slave CPU-ID received at step S1301. In other words, if the slave CPU-ID is slave CPU 4 and the interrupt cause of the leading interrupt is interrupt A, then processing of the interrupt handler A corresponding to interrupt A is requested of the slave CPU 4.

Figure 13:
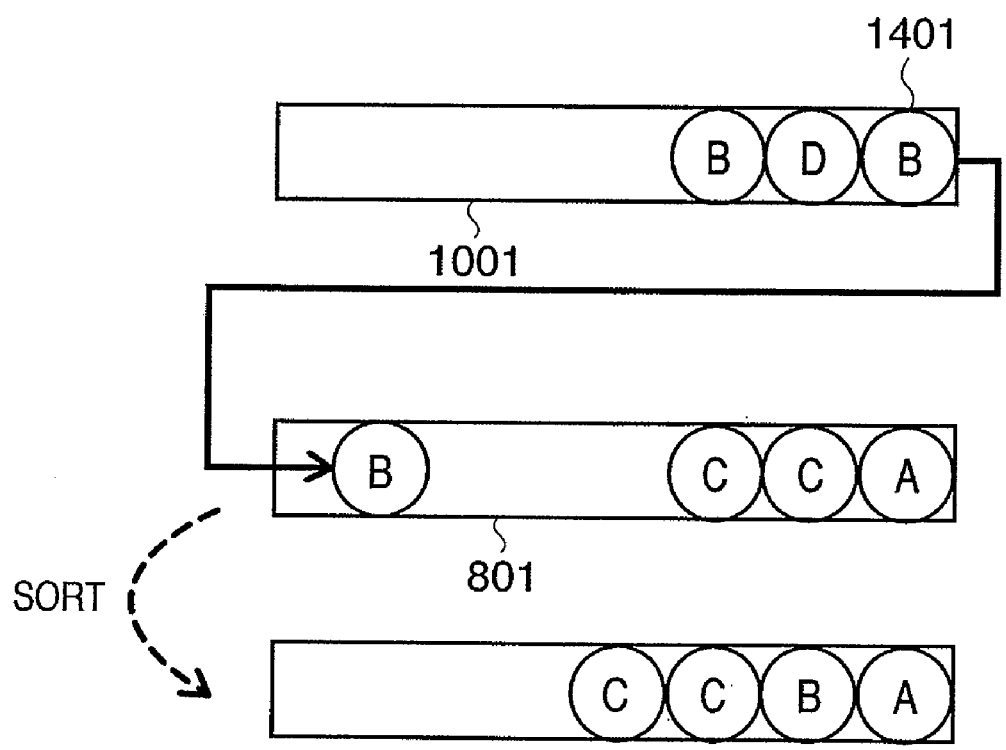
FIG. 13 is a diagram useful in describing processing for moving an interrupt of a processable-state queue to an interrupt processing queue.
Figure 14:
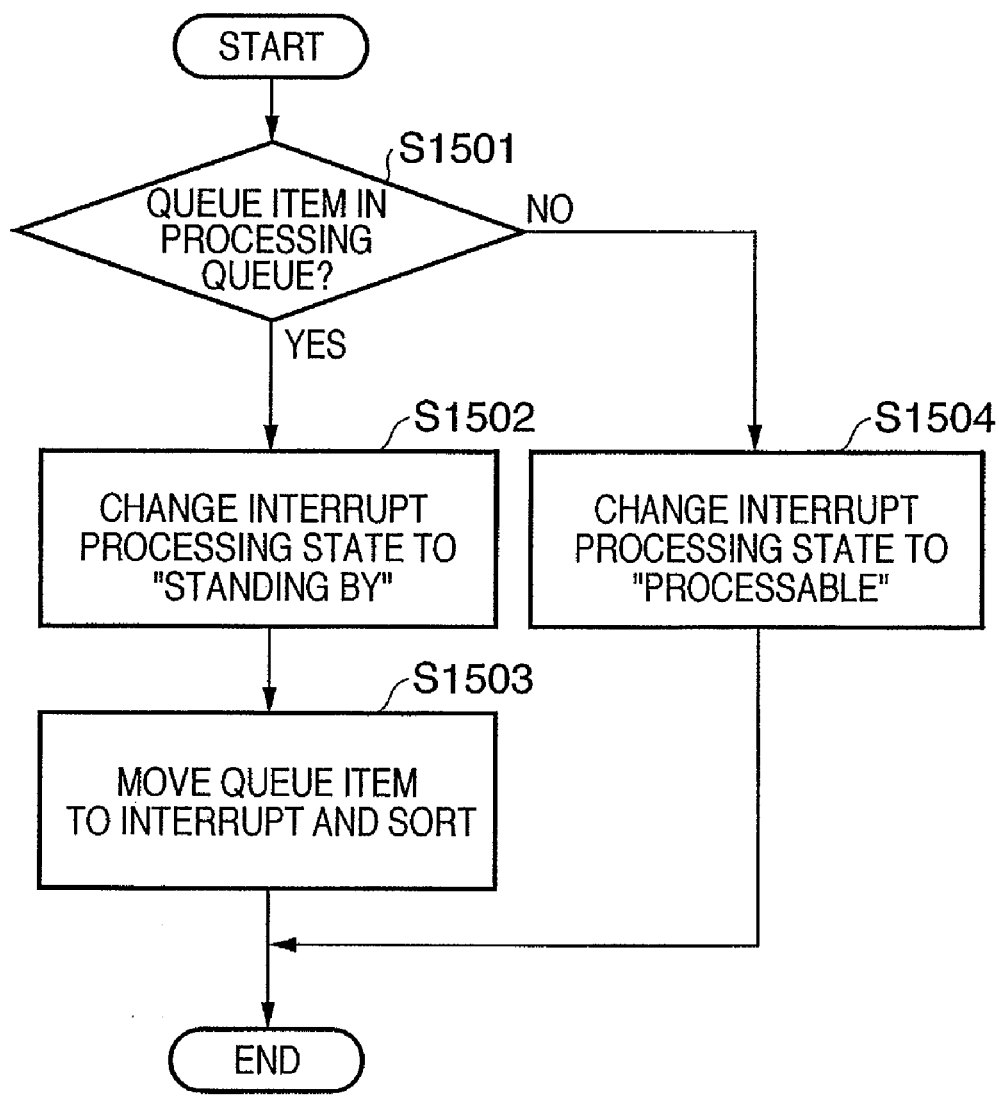
FIG. 14 is a flowchart illustrating processing for changing interrupt processing state at step S1303 in FIG. 13.

Reference will be had to FIGS. 13 and 14 to describe processing for changing processing state at step S1303.

FIG. 13 is a diagram useful in describing processing for moving an interrupt of a processable-state queue to an interrupt processing queue and FIG. 14 is a flowchart illustrating processing for changing interrupt processing state at step S1303 in FIG. 13.

First, at step S1501, it is determined whether the interrupt queue item corresponding to the interrupt received at step S1301 exists in the processable-state queue 1001. In the example shown in FIG. 13, if we assume that the ID 603 of the interrupt cause received at step S1301 is interrupt B, then it is determined at step S1501 that an interrupt queue item 1401 of the corresponding interrupt B exists in the processable-state queue 1001. Then, at step S1502, the processing state of the interrupt corresponding to interrupt B, which is the interrupt cause received at step S1301, is changed from "PROCESSING IN PROGRESS" to "STANDING BY". Accordingly, the processing of interrupt B becomes processable if any slave CPU is in the "IDLE" state.

Next, at step S1503, the interrupt queue item 1401 in the processable-state queue 1001 searched at step S1501 is extracted from the processable-state queue 1001, placed in the interrupt processing queue 801 and sorted in the order of interrupt priority.

Further, if it is determined at step S1501 that an interrupt having the interrupt ID received at step S1301 does not exist in the processable-state queue 1001, control proceeds to step S1504. Here the processing state of the interrupt corresponding to the interrupt ID which is the interrupt received at step S1301 is changed from "PROCESSING IN PROGRESS" to "PROCESSABLE" and processing is terminated. Accordingly, if the same interrupt occurs the next time, the interrupt queue item is placed in the interrupt processing queue 801 at step S1107.

Although it is assumed that there is a single processable-state queue 1001 in FIGS. 10 and 13, the queues may be created one at time per type of interrupt and controlled.

Further, there are cases where, depending upon system design, it is necessary to use a semaphore or mutex as the exclusion control method of a slave CPU or parallel-nonprocessable interrupt handler.

Second Embodiment

Next, a second embodiment of the present invention will be described in detail with reference to the drawings. The second embodiment adds on a function for assigning a dedicated slave CPU that executes interrupt processing solely with respect to a certain specific interrupt cause. For example, there are instances where there is a strict limitation on the time it takes for the end of interrupt processing of interrupt A or B having a high interrupt priority.

Figure 15:
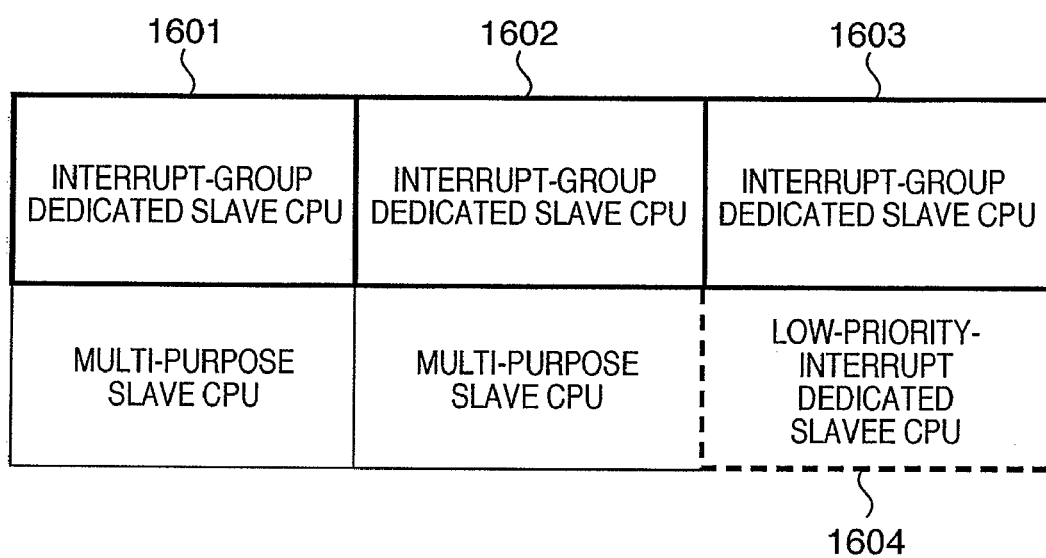
FIG. 15 is a diagram illustrating an example of interrupt control in a second embodiment, this control assigning dedicated slave CPUs 1601 to 1603 to interrupt groups.

In the second embodiment, slave CPUs 1601 to 1603 are assigned to high-priority interrupt groups, as illustrated in FIG. 15. Conversely, there is the possibility that an interrupt X or interrupt Y of low priority will go unprocessed for a long period of time. In order to avoid this, a single dedicated slave CPU 1604 for processing a low-priority interrupt is assigned.

By way of example, a dedicated slave CPU is assigned to a high-priority interrupt as follows: a high-priority interrupt group (310 in FIG. 3) of one or more high-priority interrupts, such as interrupt A and interrupt B, is decided, and one or more dedicated slave CPUs are assigned to this interrupt group.

Further, a plurality of interrupt groups may exist and one or more dedicated slave CPUs can be assigned per each of the plurality of interrupt groups. In this case, slave CPUs 1601 to 1603 can be used in the processing of interrupt group 310 but cannot be used in interrupt processing other than that of interrupt group 310.

That is, even in a case where an interrupt queue item other than one in the interrupt group 310 is in the interrupt processing queue 801 and any of the slave CPUs is in the idle state, interrupt processing of the interrupt queue item in the interrupt processing queue 801 will not be executed. The interrupt queue item other than one in the interrupt group 310 and in the interrupt processing queue 801 must wait until a slave CPU other than the slave CPUs 1601 to 1603 becomes idle.

As a result, there is a high likelihood that the dedicated slave CPUs 1601 to 1603 will wait in the idle state, the interrupts in the interrupt group 310 can be handled at high speed and it is possible to execute the interrupt processing thereof.

Figure 16:
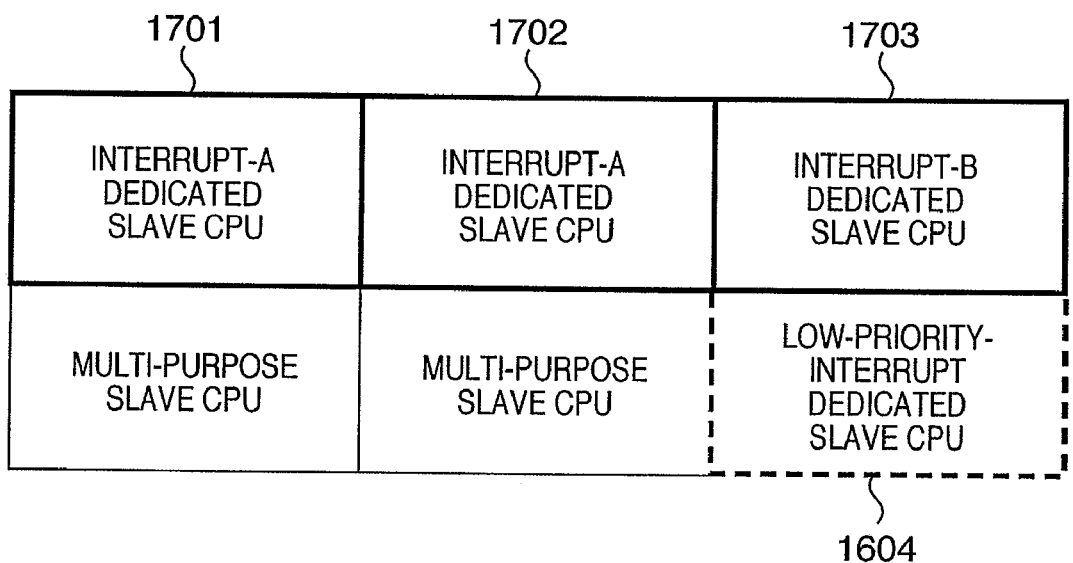
FIG. 16 is a diagram illustrating an example of interrupt control in the second embodiment, this control assigning one or more dedicated slave CPUs per one interrupt cause.

Further, a dedicated slave CPU is assigned to a high-priority interrupt as follows: One or more dedicated slave CPUs is assigned per each specific interrupt cause, as in the manner of slave CPUs 1701, 1702 for interrupt A and slave CPU 1703 for interrupt B shown in FIG. 16. In this case, slave CPUs

1701, 1702 can be used to process interrupt A and slave CPU 1703 can be used to process interrupt B. However, these slave CPUs 1701 to 1703 cannot be used in interrupt processing other than that mentioned.

That is, even in a case where an interrupt queue item other than interrupt A and interrupt B is in the interrupt processing queue and any of the slave CPUs is in the idle state, interrupt processing will not be executed, in a manner similar to that of the example described above. The interrupt queue item must wait until a slave CPU other than the slave CPUs 1701 to 1703 becomes idle.

As a result, there is a high likelihood that the dedicated slave CPUs 1701 to 1703 will wait in the idle state, the interrupts A and B can be handled at high speed and it is possible to execute the interrupt processing thereof.

In this case, one or more dedicated slave CPUs is assigned per interrupt cause depending upon number of slave CPUs, number of interrupt causes and interrupt constraints.

Further, a dedicated slave CPU is assigned to a low-priority interrupt as follows: The dedicated slave CPU 1604 is assigned beforehand to the processing of a low-priority interrupt group (311 shown in FIG. 3).

Figure 17:
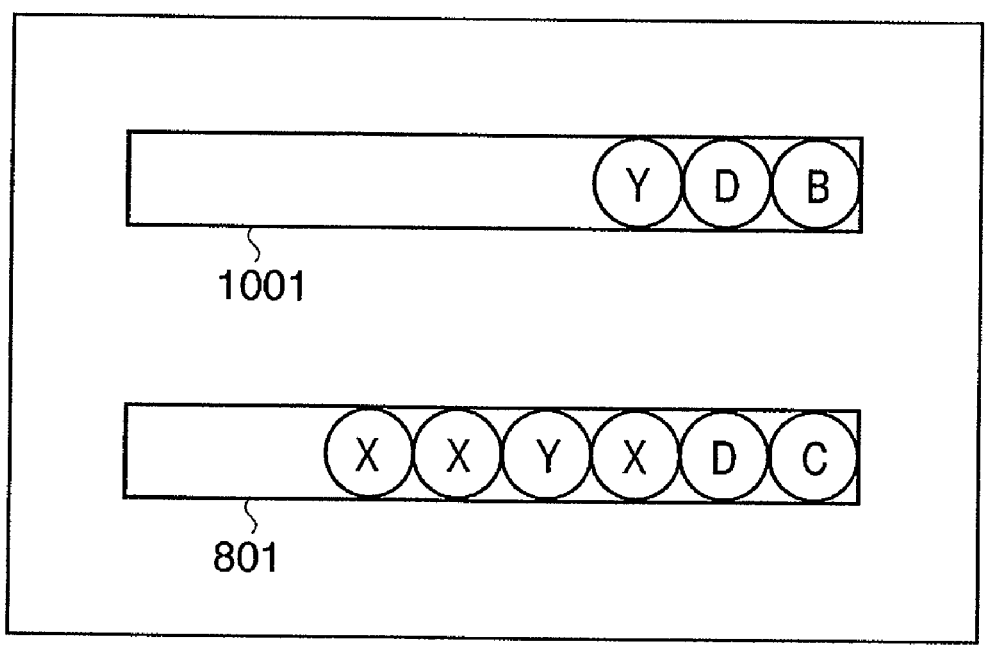
FIG. 17 is a diagram useful in describing a method of unassigning a dedicated slave CPU 1604 by interrupt queue items of a processable state queue 1001 and interrupt processing queue 801.

Further, a dedicated slave CPU is assigned to a low-priority interrupt as follows: If N or more interrupt queue items in interrupt group 311 remain in the processable-state queue 1001 and interrupt processing queue 801 shown in FIG. 17, the dedicated slave CPU 1604 is assigned. If the number of interrupt queue items in interrupt group 311 becomes M or less, then the assigned dedicated slave CPU 1604 is unassigned. By performing assignment in this manner, the possibility that processing will not be executed for an extended period of time can be avoided.

Further, a prioritized task in which an interrupt priority set in FIG. 3 has been reflected can be activated and a plurality of interrupt processes can be executed simultaneously using a single dedicated slave CPU. By thus executing processing, an interrupt can be processed without monopolizing a dedicated slave CPU even if the number of steps or source of interrupt processing is long.

As described above, a plurality of interrupts can be processed in fully parallel fashion by a plurality of CPUs. As a result, interrupt processing is speeded up and the real-time capability of the system is enhanced.

Further, interrupt processing is controlled by software without being influenced by the type of interrupt controller or architecture. This means that modification is easy even if the number of CPUs, the number of interrupt causes and the type of interrupt change.

Furthermore, since a slave CPU separate from a master CPU that receives an interrupt executes interrupt processing, the length of time over which an interrupt cannot be received is curtailed, and it is no longer necessary to implement a complicated design in which the number of interrupt processing steps is reduced as much as possible taking into consideration a factor such as a timing constraint on interrupt processing.

The present invention may be applied to a system constituted by a plurality of devices (e.g., a host computer, interface, reader, printer, etc.) or to an apparatus comprising a single device (e.g., a copier or facsimile machine, etc.).

Further, the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes read from the recording medium implement the novel functions of the embodiments and the recording medium storing the program codes constitutes the invention.

Examples of recording media that can be used for supplying the program code are a flexible disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, the present invention covers a case where an operating system or the like running on the computer performs a part of or the entire actual process based upon the designation of program codes and implements the functions of the embodiments by such processing.

Furthermore, program code read from a recording medium is written to a memory provided on a function expansion board inserted into the computer or provided in a function expansion unit connected to the computer. Thereafter, a CPU or the like provided on the function expansion board or function expansion unit performs a part of or the entire actual process based upon the designation of program codes, and the functions of the above embodiments are implemented by this processing. Such a case also is covered by the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-244832, filed Sep. 8, 2006, which is hereby incorporated by reference herein in its entirety.

What is claimed is:

1. A multiprocessor system for processing interrupts by a plurality of processors, wherein said multiprocessor system comprises:
    a first processor,
    wherein said first processor comprises:
        an accepting unit configured to accept a first interrupt;
        a management unit configured to manage a state of a second interrupt processing corresponding to the first interrupt and a state of a second processor; and
        an executing unit configured to execute a first interrupt processing in accordance with the first interrupt accepted by the accepting unit,
    wherein, in the first interrupt processing, the executing unit assigns, to the second processor, the second interrupt processing corresponding to the first interrupt accepted by the accepting unit when the second interrupt processing is in a processable state and the second processor is in a state of idle,
    wherein the executing unit sets the second interrupt processing to a standby state and sets the first interrupt processing to a first standby state when the second interrupt processing is in the processable state and the second processor is in a state of in use, and
    wherein the executing unit sets the first interrupt processing to a second standby state when the second interrupt processing is in progress based on a second interrupt or the second interrupt processing is in the standby state based on the second interrupt.

2. The system according to claim 1, wherein the executing unit selects the second processor in the first interrupt processing.

3. The system according to claim 1, wherein the executing unit assigns the second interrupt processing corresponding to the first interrupt to the second processor in accordance with the cause of the first interrupt accepted by the accepting unit.

4. The system according to claim 1, wherein the executing unit assigns the second interrupt processing to the second processor in such a manner that it is not executed in parallel with corresponding interrupt processing.

5. The system according to claim 1, wherein the first interrupt set to the second standby state is set to the second standby state until the second interrupt processing becomes the processable state.

6. The system according to claim 1, wherein the executing unit assigns the second interrupt processing corresponding to an interrupt of a specific cause to a specific processor.

7. The system according to claim 1, wherein the executing unit transmits software, which is for executing the second interrupt processing, to the second processor.

8. The system according to claim 1, wherein the first processor executes the first interrupt processing by software.

9. The system according to claim 1, further comprising an external interrupt controller and an internal interrupt controller,
wherein the external interrupt controller notifies said internal interrupt controller of an external interrupt, and the internal interrupt controller notifies the first processor of an external interrupt.

10. A processor used in a multiprocessor system for processing interrupts by a plurality of processors, the processor comprising:
an accepting unit configured to accept a first interrupt;
an executing unit configured to execute a first interrupt processing in accordance with the first interrupt accepted by the accepting unit; and
a management unit configured to manage a state of a second interrupt processing corresponding to the first interrupt and a state of a second processor,
wherein, in the first interrupt processing, the executing unit assigns, to the second processor, the second interrupt processing corresponding to the first interrupt accepted by the accepting unit when the second interrupt processing is in a processable state and the second processor is in a state of idle,
wherein the executing unit sets the second interrupt processing to a standby state and sets the first interrupt processing to a first standby state when the second interrupt processing is in the processable state and the second processor is in a state of in use, and
wherein the executing unit sets the first interrupt processing to a second standby state when the second interrupt processing is in progress based on a second interrupt or the second interrupt processing is in the standby state based on the second interrupt.

11. The processor according to claim 10, wherein the executing unit assigns the corresponding second interrupt processing to the second processor in accordance with an interrupt cause accepted by the accepting unit.

12. The processor according to claim 10, wherein the executing unit assigns the second interrupt processing to the second processor in such a manner that it is not executed in parallel with corresponding interrupt processing.

13. The processor according to claim 10, wherein the first interrupt set to the second standby state is set to the second standby state until the second interrupt processing becomes the processable state.

14. An interrupt control method in a multiprocessor system for processing interrupts by a plurality of processors, the method comprising:
accepting a first interrupt and executing a first interrupt processing by a first processor in accordance with the accepted first interrupt;
managing a state of a second interrupt processing corresponding to the first interrupt and a state of a second processor;
assigning, to the second processor, the second interrupt processing corresponding to the accepted first interrupt when the second interrupt processing is in a processable state and the second processor is in a state of idle;
setting the second interrupt processing to a standby state and the first interrupt processing to a first standby state when the second interrupt processing is in the processable state and the second processor is in a state of in use; and
setting the first interrupt processing to a second standby state when the second interrupt processing is in progress based on a second interrupt or the second interrupt processing is in the standby state based on the second interrupt.

15. The method according to claim 14, wherein in the first interrupt processing, corresponding second interrupt processing is assigned to the second processor in accordance with a cause of the accepted first interrupt.

16. The method according to claim 14, wherein in the first interrupt processing, the second interrupt processing is assigned to the second processor in such a manner that it is not executed in parallel with corresponding interrupt processing.

17. The method according to claim 14, wherein an external interrupt controller notifies an internal interrupt controller of an external interrupt; and
the internal interrupt controller notifies the first processor of an external interrupt.

18. The method according to claim 14, wherein the first interrupt set to the second standby state is set to the second standby state until the second interrupt processing becomes the processable state.

19. A computer-readable storage medium storing a computer program, said computer program comprising code for:
accepting a first interrupt;
executing a first interrupt processing in accordance with the accepted first interrupt;
managing a state of a second interrupt processing corresponding to the first interrupt and a state of a second processor;
assigning, to the second processor, the second interrupt processing corresponding to the accepted first interrupt when the second interrupt processing is in a processable state and the second processor is in a state of idle;
setting the second interrupt processing to a standby state and the first interrupt processing to a first standby state when the second interrupt processing is in the processable state and the second processor is in a state of in use; and
setting the first interrupt processing to a second standby state when the second interrupt processing is in progress based on a second interrupt or the second interrupt processing is in the standby state based on the second interrupt.

20. The storage medium according to claim 19, wherein in the first interrupt processing, corresponding second interrupt processing is assigned to the second processor in accordance with a cause of the accepted first interrupt.

21. The storage medium according to claim 19, wherein in the first interrupt processing, the second interrupt processing is assigned to the second processor in such a manner that it is not executed in parallel with corresponding interrupt processing.

22. The storage medium according to claim 19, wherein the first interrupt set to the second standby state is set to the second standby state until the second interrupt processing becomes the processable state.

* * * * *